R. Gleason, Jr.

Caster and Egg-Stand.

No. 871. Reissued Dec. 27, 1859.

Witnesses.

George Bingham

Andrew J. Vase

Inventor.

R. Gleason Jr

N. PETERS, PHOTO-LITHOGRAPHER, WASHINGTON, D. C.

UNITED STATES PATENT OFFICE.

ROSWELL GLEASON & SONS, OF DORCHESTER, MASSACHUSETTS, ASSIGNEES OF R. GLEASON, JR.

IMPROVED TABLE-CASTER.

Specification forming part of Letters Patent No. 23,218, dated March 8, 1859; Reissue No. 871, dated December 27, 1859.

*To all whom it may concern:*

Be it known that we, ROSWELL GLEASON, R. GLEASON, Jr., and EDWARD GLEASON, comprising the firm of R. GLEASON and SONS, did obtain, as assignees of R. GLEASON, Jr., Letters Patent for a "new and useful article of manufacture, the same being a Combination of Caster, Egg-Stand, and Bell," which Letters Patent are dated March the 8th, 1859; and that we, for the purpose of obtaining a Reissue, declare the following to be a full, clear, and exact description of the invention for which said Letters Patent were issued.

The invention consists in combining an egg-stand, caster, and bell, as hereinafter fully shown and described, whereby either article may be used separately or the whole or certain parts in combination, as hereinafter described.

To enable those skilled in the art to fully understand and construct the invention, we will proceed to describe it.

Figure 1:
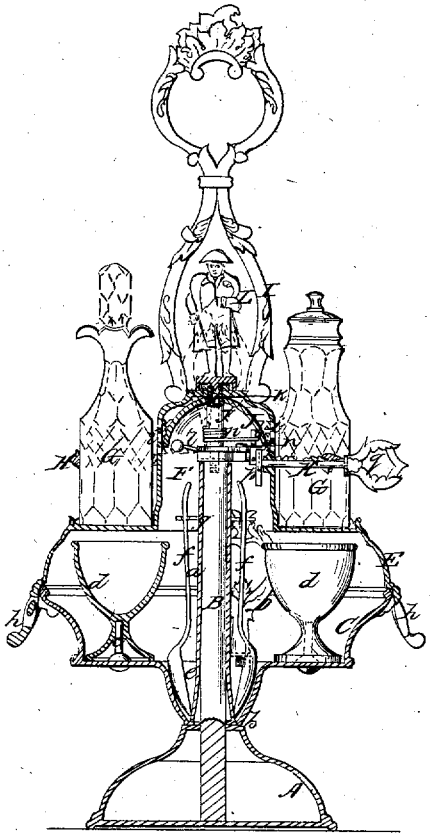

A, Figure 1, represents a base, in which a vertical rod, B, is placed centrally, and C is a circular basin or dish, which is provided with a central tube, *a*, through which the rod B passes, the tube *a* extending nearly to the top of the rod B, as shown clearly in Fig. 1. The basin or dish C is allowed to rotate freely on the rod B, the bottom of the basin or dish resting or bearing on the top *b* of the base A, a sufficient bearing-surface being allowed for such purpose. Within the dish or basin C a series of vertical rods, *c*, are secured, on which egg-cups *d* are placed, said rods keeping the cups in proper position; and at the center of the dish or basin, encompassing the base of the tube *a*, an annular chamber, *e*, is formed to receive the bowls of spoons *f*, the upper ends of which are secured in a circular rack, *g*, attached to the upper part of the tube *a*.

The above parts, which are all shown in Fig. 1, constitute a revolving egg-stand, and, if used separately, a handle, D, may be screwed into the upper end of the rod B, as shown in red, Fig. 1.

E is a circular inverted dish having a cylindrical chamber, F, at its center, said chamber being considerably smaller in diameter than the dish E, so as to afford space all around it to hold cruets G, which are placed in annular holders H, secured to the upper part of the chamber F.

Figure 2:
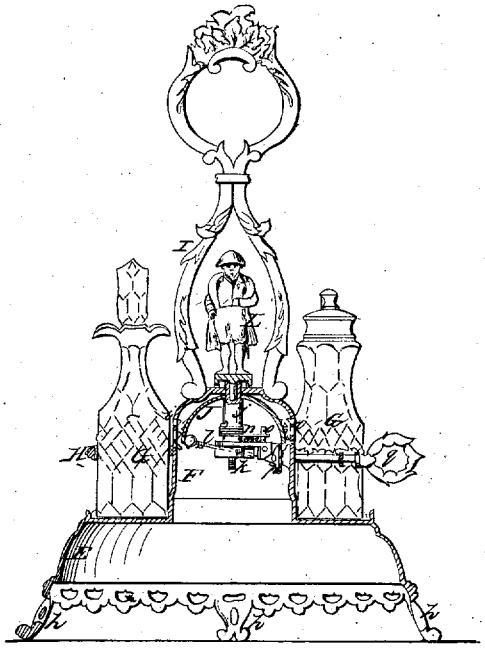

The bottom of the dish E is provided with feet *h*, and to the upper part of the chamber F a handle, I, is attached, as shown clearly in Fig. 2.

Within the upper part of the chamber F a bell, J, is secured, the part of the chamber which immediately encompasses said bell being perforated, as shown at *i*. The bell is secured in proper position by a tube, *j*, through which a screw-rod, *k*, passes. On the tube *j* a hammer-rod, *l*, is secured by a pivot, *m*, and *n* is a spring which is connected with the hammer-rod, as shown at *o*.

K is a rod which passes horizontally through the chamber F, and has a wiper, *p*, on its inner end, within the chamber F, the outer end of said rod having a handle, *q*, placed on it. The bell J, it will be seen, is sounded by turning the rod K, the wiper *p* of which, in connection with the spring *n*, actuates the hammer-rod *l*.

The parts which are shown in Fig. 2 and latterly described constitute the caster and bell, and may be used detached from the egg-stand, if desired. When used in connection with the egg-stand, the handle D is detached from the upper end of the rod B and the caster placed over the egg-stand, the screw-rod *k* being screwed into the upper end of the rod B by means of any suitable handle, L. The inverted dish or basin E of the caster serves as a cover for the egg-stand, concealing it and its appurtenances from view, and the egg-stand serves as a revolving base for the caster, the whole forming a very useful and unique article for the table, and one that may be constructed much cheaper than if the several parts were made separately, for one device is made in a measure to serve the other. For instance, a caster, whether stationary or rotary, should, if proportion is at all considered, have a base of some considerable height, and the same may be said of an egg-stand.

By this invention one base is used for both the egg-stand and caster, and as the former comparatively is but rarely used, it serves as a superior revolving base for the caster, which is almost invariably used. Many, therefore, who would not go to the expense of providing themselves with an egg-stand would purchase the several parts combined at a slight advance on the cost of a caster alone.

What we claim as new, and desire to secure by Letters Patent, is—

1. The combination of the caster and egg-stand.

2. The combination of the caster and bell.

3. The combination of the caster, egg-stand, and table-bell, substantially as described.

ROSWELL GLEASON.
R. GLEASON, JR.
EDWARD GLEASON.

Witnesses:
CHS. P. RIPLEY,
ROBERT VOSE.